United States Patent Office 3,574,535
Patented Apr. 13, 1971

3,574,535
PROCESS FOR MANUFACTURING SODIUM TRIPOLYPHOSPHATE
Iuliu Molodovan and Marinela Man, Bucharest, Rumania, assignors to Ministerul Industriei Chimice, Bucharest, Rumania
No Drawing. Filed June 18, 1968, Ser. No. 737,821
Claims priority, application Rumania, June 20, 1967, 54,075
The portion of the term of the patent subsequent to Sept. 9, 1986, has been disclaimed
Int. Cl. C01b 25/30, 25/38
U.S. Cl. 23—107                               1 Claim

ABSTRACT OF THE DISCLOSURE

The novel method of manufacturing sodium tripolyphosphate according to this invention comprises the countercurrent extraction of wet process phosphoric acid with 28 to 32% $P_2O_5$ content with a polar organic solvent such as n-butanol, preventing thus the disadvantages related to the multistep purification used in the ordinary process. The organic phase, formed of n-butanol, phosphoric acid and water is neutralized, as such or after a more advanced purification to remove $SO_4^{2-}$ ions with CaO or $CaCO_3$, at pH=7.2 to 7.5 and at a temperature of 60° to 70° C. in a single step with a $Na_2CO_3$ or NaOH solution, used as such or after saturation at 50° C., to obtain a molecular mixture $NaH_2PO_4:Na_2HPO_4$ of 1:2. The crystal suspension that is separated from butanol by centrifugation, is dried, homogenized by grinding, and calcined.

The quality of the product is comparable with that of sodium tripolyphosphate obtained from electrothermic phosphoric acid.

---

Reference is made to copending application 615,927, issued Sept. 9, 1969 now Pat. No. 3,466,141.

The present invention relates to a process for obtaining sodium tripolyphosphate of high purity.

Sodium tripolyphosphate manufacture has first been developed with the use of electrothermic phosphoric acid, the high purity of which poses no technological problems. By neutralizing this acid with $Na_2CO_3$ in a ratio such that the final solution shall contain a mixture of monosodium and disodium phosphate in a 1:2 ratio, drying this mixture and calcining the resulting crystal mixture, sodium tripolyphosphate of high purity is obtained.

The increase in the demand for sodium tripolyphosphate, as well as the high cost price of the electrothermic phosphoric acid, have raised the problem of using wet-process phosphoric acid. Although this latter is used in an increasing degree, there is a set of problems relating to the removal of the impurities inherently present in the wet-process phosphoric acid, such as: fluorine, iron, aluminum, calcium, sulphuric acid, that have not yet been completely and satisfactorily resolved.

In the common process for manufacturing sodium tripolyphosphate, the purification of the wet-process phosphoric acid is achieved in several steps. In the first step, the removal of the free sulphuric acid is carried out either with barium salts or with phosphate rock, followed by filtration of the formed suspension. In the following step, the fluorine ions are precipitated by sodium carbonate, and the clear solution is subsequently passed to neutralization, in order to obtain the mentioned phosphate mixture. During neutralization of the phosphoric acid from the solution, the rest of the impurities are precipitated in the form of calcium, aluminum and iron phosphates, which must also be removed before drying-calcining.

Another purification process for the wet-process acid allows the removal of the impurities before neutralizing with NaOH, and which is based on crystallization. In the first step, the wet-process phosphoric acid with an about 30% $P_2O_5$ content is neutralized with $NH_3$ at a pH corresponding to the formation of monoammonium phosphate, when most of the existing impurities are precipitated. After separating these later by centrifuging, the monoammonium phosphate mother solutions are treated with sodium hydroxide in a molar ratio $Na_2O:P_2O_5$ of 1:1, such that the formation of crystals of the mixed salt $NaNH_4HPO_4$ occurs. Subsequent to their separation, these crystals are dissolved by heating with a ⅔ M. NaOH solution in a ratio so calculated that the crystal mixture $$NaH_2PO_4 + 2Na_2HPO_4$$

and $NH_3$ results, the $NH_3$ is distilled and recycled to the first purification step.

The present invention eliminates the mentioned disadvantages related to the purification in several steps in that it provides a method, after extraction of the wet-process phosphoric acid with organic solvents for instance with butanol, of neutralizing the organic extract, as such or after purification, at pH=7.4 to 7.5 and at a temperature of 60° to 70° C. in a single step with a $Na_2CO_3$ or NaOH solution saturated at 50° C. in a ratio so calculated as to obtain a molecular mixture $$NaH_2PO_4:2Na_2HPO_4$$

of 1:2. The crystal suspension is separated from butanol, dried and calcined according to known methods.

The application of the invention is illustrated in the following two examples:

EXAMPLE 1

The wet-process phosphoric acid with an about 30% $P_2O_5$ content is extracted with n-butanol in a volumetric solvent:acid ratio of 1.5:1 in a mixer-settler with 9 extraction units. 100 g. of the organic extract, as such or after purification to remove $SO_4$ and F ions, and having the following composition: $H_3PO_4$ 16.3%, $SO_4$ 0.1%, F 0.17%, $Fe_2O_3$ 0.016%, $Al_2O_3$ 0.008%, n-butanol 60.3% and $H_2O$ 22.9%, is neutralized under stirring with 45.8 g. of an at 50° C. saturated $Na_2CO_3$ solution (32%), at pH=7.4 and at a temperature of 60° to 70° C. resulting from the reaction, in a solvent refluxing system. The 18% $H_2O$ containing solvent is separated from the crystal suspension by decanting, 107 g. of solvent and 57.0 g. of saturated solution, containing 22.4 g. of the crystal mixture, 33.6 g. of water and 1 g. of butanol, are thus resulting. This mixture is dried in a hot gas current, at a temperature of 80° to 90° C., up to a 2-3% humidity, after having previously added to it 1 g. of $NH_4NO_3$ for the stabilization of the final product. The hot gases are then cooled in order to recover the solvent, which is sent, together with that resulting from decanting, to water removal, that is carried out by a known process. The dried crystals having a mixed phosphates content of 99.5%, $SO_4$ 0.3% and Fe 0.002%, are calcined at 250°–450° C. in order to obtain sodium tripolyphosphate.

EXAMPLE 2

The same procedure is followed as in Example 1, with the difference that neutralizing is carried out with 18.5 g. of a NaOH solution (60%), saturated at 50° C., under the same conditions. After neutralization, the organic extract is further processed in the same way.

The process according to this invention presents the following advantages:

It allows the preparation of the monosodium-disodium phosphate mixture of a purity comparable to that of the products obtained from the electrothermic phosphoric acid, The neutralization of the extract in order to obtain the mentioned mixture is achieved in a single step, and not in three steps as it is commonly performed.

What we claim is:

1. In a process for manufacturing sodium tripolyphosphate of high purity by neutralizing an organic extract formed of phosphoric acid, butanol and water, obtained by extracting wet-process phosphoric acid by butanol, with a saturated $Na_2CO_3$ or $NaOH$ solution, the improvement in which the neutralization is carried out in a single step at a temperature of 50° to 60° C. and at pH=7.4 to 7.5 and so as to obtain crystals having a molecular mixture in a ratio of 1:2 of $NaH_2PO_4$:$Na_2HPO_4$, separating, drying, and calcining said crystals at 250° to 450° C. to yield the sodium tripolyphosphate.

References Cited

UNITED STATES PATENTS

| 1,929,443 | 10/1933 | Milligan | 23—107 |
| 2,811,419 | 10/1957 | Hartlapp et al. | 23—107 |
| 3,309,174 | 3/1967 | Pals | 23—107 |
| 3,466,141 | 9/1969 | Moldovan et al. | 23—107 |

OTHER REFERENCES

Van Wazer: Phosphorus and Its Compounds, vol. 2, 1961, pp. 1052–1055.

OSCAR R. VERTIZ, Primary Examiner

G. A. HELLER, Assistant Examiner

U.S. Cl. X.R.

23—165